May 26, 1970     H. W. JOHANNSEN     3,514,199

SLIDE PROJECTOR

Filed July 31, 1967     3 Sheets-Sheet 1

INVENTOR
Hans Werner Johannsen
BY
Michael S. Striker
ATTORNEY

May 26, 1970    H. W. JOHANNSEN    3,514,199
SLIDE PROJECTOR

Filed July 31, 1967    3 Sheets-Sheet 2

INVENTOR
Hans Werner Johannsen
BY
Michael S. Striker,
ATTORNEY

May 26, 1970  H. W. JOHANNSEN  3,514,199
SLIDE PROJECTOR

Filed July 31, 1967  3 Sheets-Sheet 3

INVENTOR
Hans Werner Johannsen
BY
Michael S. Striker
ATTORNEY

United States Patent Office 3,514,199
Patented May 26, 1970

---

3,514,199
SLIDE PROJECTOR
Hans Werner Johannsen, Frankfurt am Main, Germany, assignor to Braun Aktiengesellschaft, Frankfurt am Main, Germany
Filed July 31, 1967, Ser. No. 657,280
Claims priority, application Germany, July 30, 1966, B 88,273
Int. Cl. G03b 23/04
U.S. Cl. 353—115                                16 Claims

ABSTRACT OF THE DISCLOSURE

The slide changer of a slide projector is operated by a longitudinally movable actuating member at least a portion of which is also turnable or pivotable to move the magazine forwards or backwards when the slide changer returns a slide into the magazine. The actuating member cannot turn or pivot when the slide changer grips a slide, and such pivoting or turning of the actuating member is prevented by a stationary guide which has a recess a first section of which snugly receives a follower of the actuating member when a slide is removed from the magazine and a second section of which permits the follower to turn or pivot when the slide changer returns a slide into the magazine and is disengaged from such slide.

BACKGROUND OF THE INVENTION

The present invention relates to slide projectors in general, and more particularly to improvements in that part of the mechanism in a slide projector which operates the slide changer and transports the magazine to place selected slides into the range of the slide changer. Still more particularly, the invention relates to improvements in slide projectors wherein stepwise movements of the magazine and the operation of slide changer are preferably effected by hand.

In many presently known manually operated slide projectors, a rotary shaft of the slide changer extends transversely across and below the space for the magazine, and the shaft has a pinion which can mesh with a rack on the magazine so that the latter can be transported forwards or backwards in response to rotation of the shaft. The pinion is disengaged from the rack when the shaft assumes an axial position in which the slide changer is disengaged from a slide, i.e., when the slide changer has returned a slide into the magazine and cannot prevent forward or backward movement of the magazine with reference to the housing of the slide projector. A projection of the slide changer engages the magazine during axial movement of the shaft to prevent displacement of the magazine while a slide is being held by the slide changer. The latter then locks the magazine and the magazine in turn prevents rotation of the shaft.

A serious drawback of such slide projectors is that, if a careless or inexperienced operator attempts to turn the shaft while a slide is being held my the slide changer, the teeth of the pinion on the shaft, the projection of the slide changer, and/or the teeth of the rack on the magazine are subjected to considerable stresses which can result in damage to or destruction of such parts. Also, the teeth of the pinion are likely to jam or to undergo deformation to prevent orderly transport of the magazine. The same holds true for the magazine and the projection of the slide changer. Furthermore, the projection of the slide changer occupies additional room and, if not arranged to engage with the rack of the magazine, such projection must be designed to engage the partitions between the slide compartments or other parts of the magazine which must be provided for the express purpose of preventing displacement of the magazine when a slide has been withdrawn from its compartment. This contributes to the initial cost of the magazine. The slide changer must engage selected portions of slides and should be protected against excessive stresses which are likely to arise if the user applies torque to the shaft at the time when the slide changer grips a slide and simultaneously blocks movements of the magazine.

SUMMARY OF THE INVENTION

It is an important object of the present invention to provide a slide projector wherein a single actuating member can transport the magizine forwards and backwards and can also operate the slide changer simultaneously with immobilization of the magazine when a slide is gripped or otherwise held or supported by the slide changer.

Another object of the invention is to provide a slide projector of the just outlined character wherein improper manipulation of the actuating member cannot result in overstressing of or damage to the magazine and/or slide changer.

A further object of my invention is to provide a slide projector wherein the exact design of the slide changer does not influence the manipulation of the actuating member and which can embody slide changers which extend into the magazine or which merely engage the edges of the frame of a slide outside of the confines of the magazine.

An additional object of the invention is to provide a novel housing for a slide projector of the above outlined character and to design the housing in such a way that it prevents the actuating member from transmitting stresses to the magazine (either directly or through the intermediary of the slide changer) when the slide changer grips a slide.

A concomitant object of the invention is to provide a slide projector wherein the slide changer need not block movements of the magazine.

An ancillary object of the invention is to provide a novel manually operable actuating member which can effect backward or forward movement of the magazine and which can also operate the slide changer.

A further object of the invention is to provide an actuating member which occupies little room and which can be readily employed in connection with different types of magazines and/or slide changers.

Briefly outlined, my invention is embodied in a slide projector which comprises a housing arranged to accommodate a displaceable magazine for a supply of slides, transporting or slide changer means provided in the housing and operative to move selected slides between the magazine and a projection position, control means for operating the transporting means and for displacing the magazine with reference to the housing, the control means comprising a preferably manually operated actuating member movable in a first direction between first and second positions to thereby operate the transporting means and at least a portion of the actuating member being also movable in a second direction in the first position of the actuating member to thereby effect displacements of the magazine so as to place a fresh slide into the range of the transporting means, and guide means provided in or on the housing to hold the actuating member against movement in the second direction when the actuating member is out of first position.

The actuating member may include an elongated rod which is movable lengthwise (axially) in the first direction and which is turnable about its axis in the second direction. Alternatively, the actuating member may comprise two articulately connected portions which move as a unit in the first direction but one of which can be pivoted back and forth in a horizontal plane during movement in the second direction.

The guide means preferably comprises a stationary member rigid with or forming part of the housing and having a recess or opening including a relatively narrow elongated first section or slot and a relatively wide second section. The actuating member comprises a follower which is snugly received in the first section when the actuating member is out of its first position and which is received with clearance in the second section in the first position of the actuating member.

The novel features which are considered as characteristic of the invention are set forth in particular in the appended claims. The improved slide projector itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
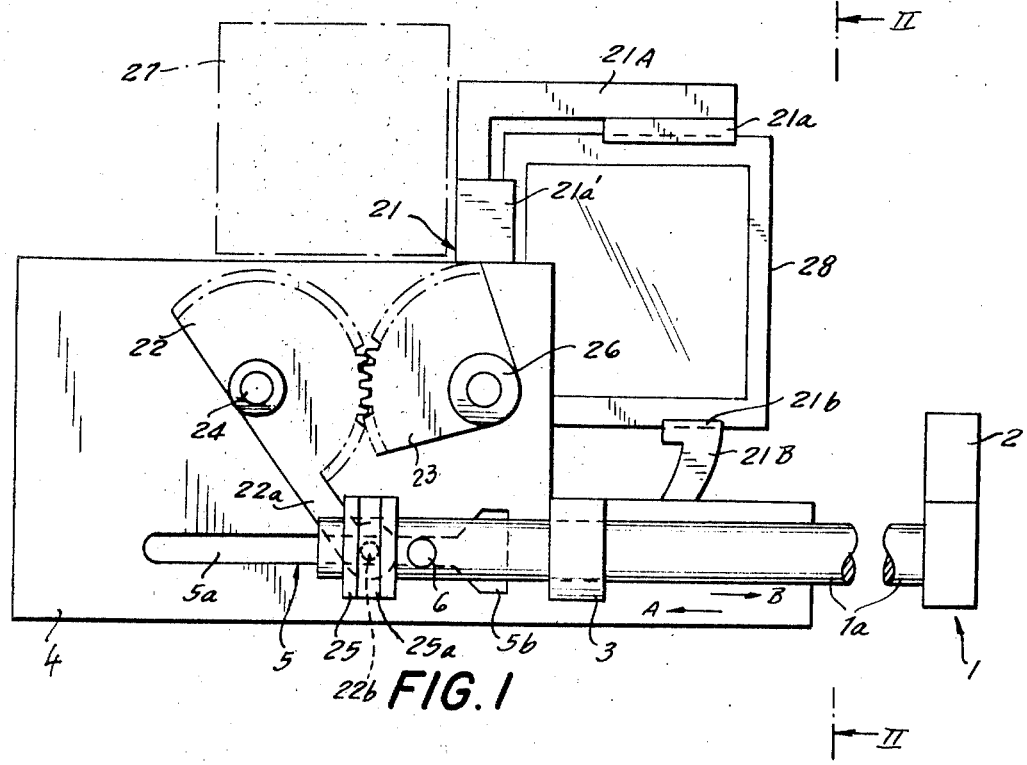
FIG. 1 is a schematic end elevational view of a slide projector embodying a first actuating member which is shown in an intermediate position during transport of a slide from the magazine to projection position.

Referring first to FIGS. 1 to 4, there is shown a slide projector which includes a housing having a stationary guide member or wall 4 provided with a bearing 3 for an axially reciprocable and turnable actuating member 1 constituting a control means for effecting movements of the magazine 30 (FIG. 2) and for operating a transporting mechanism 21 (hereinafter called slide changer) for slides 28. As shown in FIG. 1, the guide member 4 is located in a vertical plane and its bearing 3 confines the rod 1a of the actuating member 1 for movement in a horizontal plane. One end of the rod 1a carries a knob 2 which can be shifted or turned by hand. The direction of axial or lengthwise movement of the actuating member 1 is indicated in FIG. 1 by arrows A and B, such movement being utilized to operate the slide changer 21. Turning of the actuating member 1 about the axis of the rod 1a is employed to effect forward and backward movements of the magazine 30.

Figure 3:
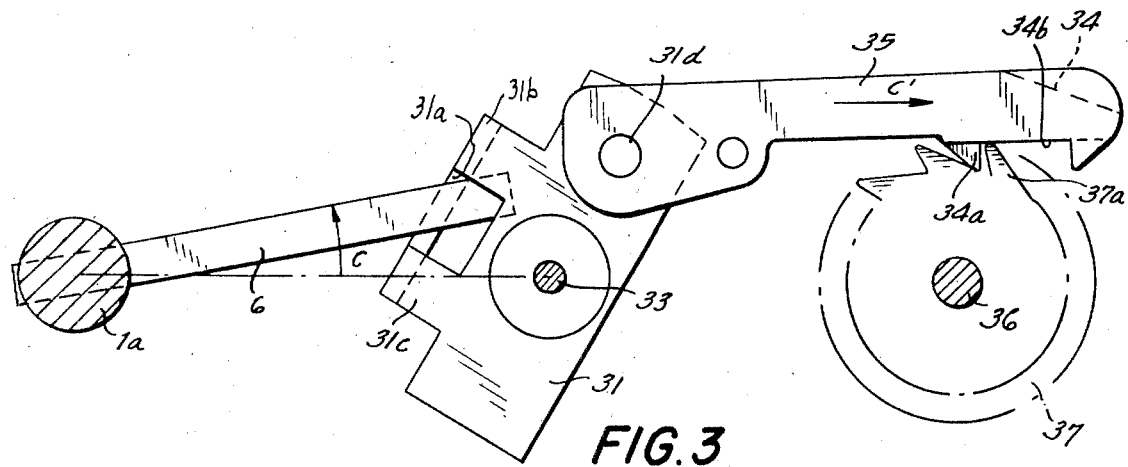
FIG. 3 illustrates certain details of a transmission between the actuating member and the magazine, the transmission being shown in one end position upon completion of stepwise transport of the magazine in forward direction.
Figure 4:
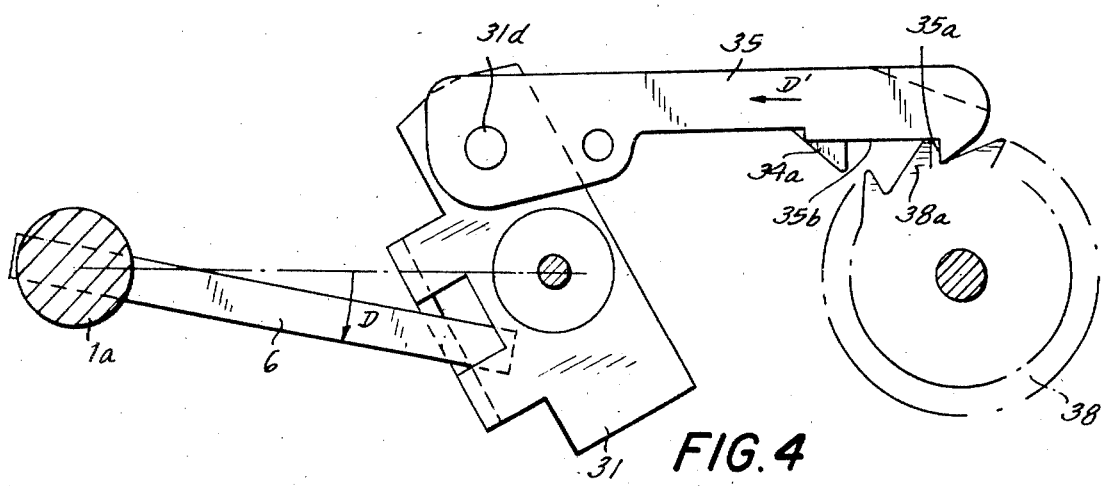
FIG. 4 illustrates the structure of FIG. 3 but with the transmission in another end position upon completed transfer of the magazine in rearward direction.

In accordance with a feature of my invention, the guide member 4 is provided with a recess or opening 5 which includes a narrow elongated slot-like first section 5a (hereinafter called slot) and a shorter but relatively wide second section 5b. The rod 1a of the actuating member 1 is provided with a radially extending tooth-like follower 6 which is snugly received in the slot 5a of the recess 5 when the actuating member is moved axially from a first or starting position (arrow A) to operate the slide changer 21 for the purpose of moving a selected slide 28 from the magazine 30 and for transporting such slide to a projection position 27 (shown in FIG. 1 by phantom lines). When the actuating member 1 moves back to the starting position (arrow B), the follower 6 is also guided in the slot 5a and prevents the operator from turning the actuating member, i.e., from changing the position of the magazine 30. The second section 5b of the recess 5 is wide enough to permit turning of the actuating member 1 in a direction about the axis of the rod 1a as indicated in FIGS. 3 and 4 by arrows C and D. Such movements of the actuating member 1 are utilized to shift the magazine 30 forwards or backwards. The actuating member 1 is in a neutral or zero position when its follower 6 extends into the section 5b of the recess 5 but registers with the slot 5a. The magazine 30 is then shiftable by hand and can be withdrawn from the slide projector.

Figure 2:
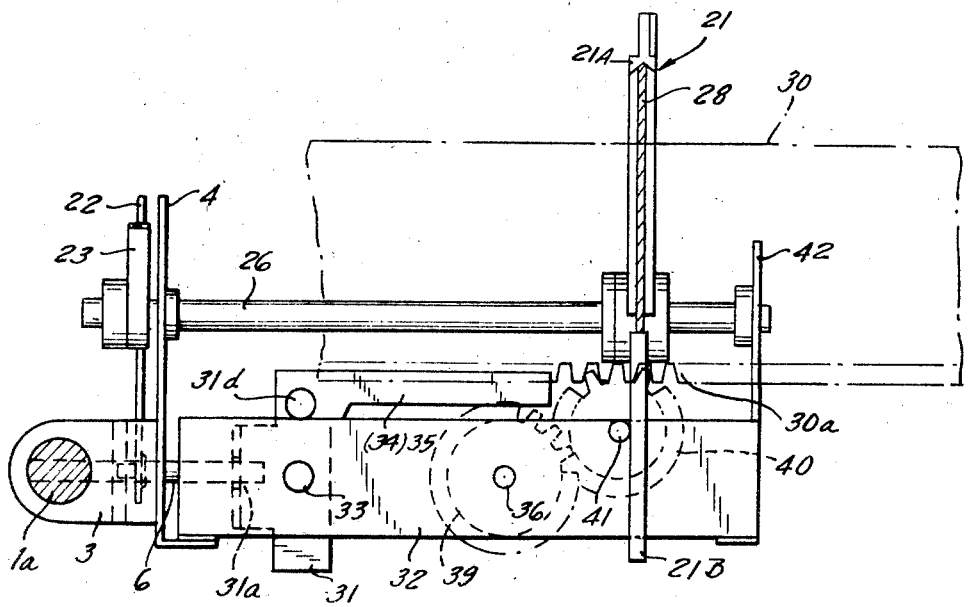
FIG. 2 is a section as seen in the direction of arrows from the line II—II of FIG. 1.

The slide changer 21 comprises two claws or jaws 21A, 21B which are movable with as well as relative to each other in a manner substantially or exactly as disclosed in U.S. Pat. No. 3,174,395 to Krull. As shown in FIGS. 1 and 2, the claws 21A, 21B are mounted on a horizontal shaft 26 which is parallel with a second shaft 24. The shafts 24, 26 respectively carry meshing gear segments 22, 23. The segment 22 has an extension or arm 22a provided with a follower pin 22b which extends into the groove 25a of a cam 25 mounted on the rod 1a of the actuating member 1. When the actuating member is moved axially as indicated by the arrow A, the cam 25 rocks the arm 22a of the gear segment 22 through the intermediary of the follower pin 22b whereby the segment 22 turns the shaft 24 in a clockwise direction (as viewed in FIG. 1) and causes the segment 23 to turn the shaft 26 in a counterclockwise direction. The jaws 21A, 21B are provided with gripping portions 21a, 21b which respectively engage the bottom and top edges of the frame on a slide 28 which is in the range of the slide changer 21. The claw 21A comprises a second gripping portion 21a' which engages one vertical edge of the frame. In response to further depression of the actuating member 1 (arrow A), the follower 6 of this actuating member continues to slide in the slot 5a and the shafts 24, 26 cause the claws 21A, 21B to transport the slide 28 to the projection position 27 of FIG. 1. During such travel, the slide 28 is turned through 90 degrees in its own plane so that the gripping portion 21a' engages the frame of such slide from below and the edges engaged by the gripping portions 21a, 21b then extend vertically. When in projection position 27, the slide 28 registers with the projection window of the projector so that its image is projected onto the screen when the lamp is on.

The claws 21A, 21B are biased by a torsion spring (not shown) which is coiled around the shaft 26 and tends to bias the gripping portions 21a, 21a', 21b into engagement with the frame of that slide 28 which has been placed into the range of the slide changer 21, i.e., into the plane of the claws 21A, 21B. When the gripping portions 21a, 21a', 21b are permitted to engage the frame of the slide 28, the latter is properly located for movement toward, into, and back from the projection position 27. The exact manner in which the claws 21A, 21B cooperate to engage, transport, return and release selected slides in the magazine 30 is fully disclosed in the aforementioned patent to Krull and by itself forms no part of my present invention.

In the slide projector of FIGS. 1 to 4, the follower 6 of the actuating member 1 simultaneously serves as a means for effecting forward and backward movements of the magazine 30. This follower 6 can be retracted into the second section 5b of the recess 5 in response to return movement of the actuating member 1 to the first or starting position (arrow B in FIG. 1). In such starting position of the member 1 (slightly to the right of the position shown in FIG. 1), the follower 6 extends into the gap 31a between two prongs 31b, 31c of a bifurcated rocker 31 which forms part of a transmission between the actuating member 1 and the magazine 30 (see particularly FIGS. 3 and 4). When the actuating member 1 is retracted to first or starting position, the magazine 30 is released and can be shifted by hand to place a selected slide 28 into the range of the slide changer 21 or to be withdrawn from the housing of the slide projector in order to provide room for a fresh magazine (not shown). The claws 21A, 21B are then disengaged from the slide 28 and permit unimpeded lengthwise movements of the magazine 30. The manner in which the claws of a slide changer can be fully disengaged from the magazine and from a slide therein is fully disclosed in the Krull patent.

The mounting of the rocker 31 is such that it can cause lengthwise movement of the magazine 30 by distances corresponding to that between the planes of two adjoining slides 28. The aforementioned transmission between the actuating member 1 and magazine 30 further comprises two pawls 34, 35 which are pivotally connected with the rocker 31 and respectively carry pallets 34a, 35a disposed in parallel planes. The rocker 31 is mounted on a shaft 33 and carries a pivot pin 31d for the pawls 34, 35. The shaft 33 is mounted in a portion 32 of the projector housing. The pallets 34a, 35a of the pawls 34, 35 respectively cooperate with ratchet wheels 37, 38 mounted on a shaft 36 which is journalled in the portion 32 of the slide projector housing. Each tooth on each of the ratchet wheels 37, 38 has a substantially radially extending flank.

If the actuating member 1 is moved to starting or first position (FIGS. 3 and 4) and the knob 2 is thereupon turned in the direction of the arrow C shown in FIG. 3, the follower 6 pivots the rocker 31 in a clockwise direction because it transmits motion to the prong 31b. In FIG. 3, the ratchet wheel 38 has been omitted for the sake of clarity. The pallet 34a of the pawl 34 moves in the direction indicated by arrow C' and engages the radial flank on the adjoining tooth 37a of the ratchet wheel 37 to index the ratchet wheel 37 so that the latter turns the shaft 36 through an angle necessary to shift the magazine 30 by a step, i.e., by a distance corresponding to that between the planes of two adjoining slides 28.

When the knob 2 is thereupon turned in a counterclockwise direction, as viewed in FIG. 3, the follower 6 bears against the prong 31c and returns the rocker 31 to a neutral position. The pawls 34, 35 are entrained by the pin 31d and travel to the left, as viewed in FIG. 3, whereby the pallet 34a simply travels past one tooth 37a of the ratchet wheel 37, i.e., the angular position of the shaft 36 remains unchanged. The pallet 35a of the pawl 35 approaches the radial flank on the adjoining tooth 38a of the ratchet wheel 38. The numeral 34b denotes in FIG. 3 a straight edge face of the pawl 34 which slides on the top land of the adjoining tooth 37a when the pawl 34 moves to the left. A yieldable detent may be provided to hold the shaft 36 and ratchet wheels 37, 38 against rotation when the pawl 34 moves to the left, as viewed in FIG. 3, until the rocker 31 returns to neutral position.

When the knob 2 is thereupon turned in a counterclockwise direction (arrow D in FIG. 4), the follower 6 again bears against the prong 31c and turns the rocker 31 in a sense to move the pawls 34, 35 in the direction indicated by arrow D'. The pallet 35a engages the adjoining tooth 38a and turns the shaft 36 in a counterclockwise direction whereby the magazine 30 moves a step backward and again places a slide 28 into the range of the claws 21A, 21B. When the knob 2 is thereupon returned to zero or neutral position, the edge face 35b of the pawl 35 slides along the top land of the adjoining tooth 38a, i.e., the pawl 35 fails to turn the ratchet wheel 38. The pallet 34a approaches the radial flank of the adjoining tooth 37a and is ready to turn the ratchet wheel 37 if the operator decides to move the rocker 31 to the position shown in FIG. 3.

The shaft 36 for the ratchet wheels 37, 38 carries a spur gear 39 which meshes with a pinion 40, the latter being in mesh with the rack 30a at the underside of the magazine 30. The pinion 40 is mounted on a shaft 41.

The housing of the slide projector comprises a further wall 42 (see FIG. 2) which supports the right-hand end of the shaft 26.

Figure 6:
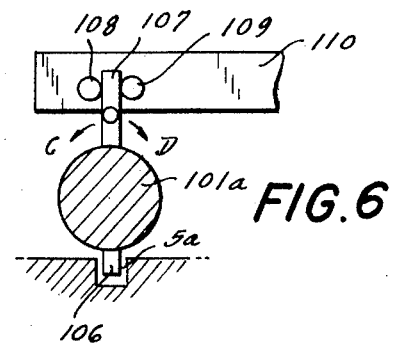
FIG. 6 is a section as seen in the direction of arrows from the line VI—VI of FIG. 5, further showing a portion of the transmission which receives motion from the actuating member to transport the magazine.
Figure 5:
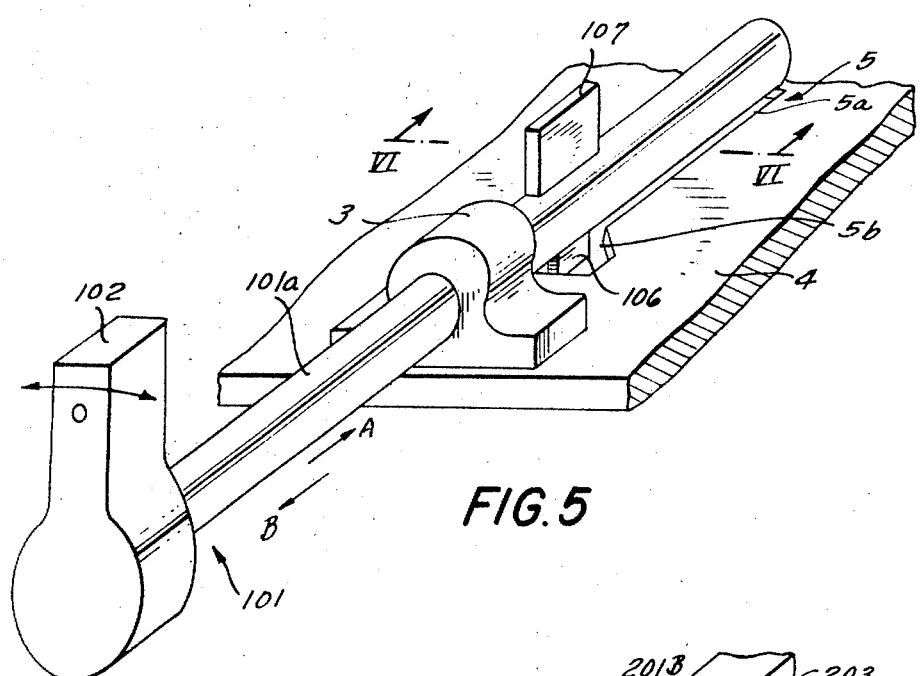
FIG. 5 is a fragmentary perspective view of a second slide projector with a modified actuating member.

FIGS. 5 and 6 show a portion of a modified slide projector. The actuating member 101 has a rod 101a provided with a knob 102 and mounted in the bearing 3 of the fixed guide member 4 in the same way as described in connection with FIGS. 1 and 2. The follower 106 of the rod 101a is slidable in the slot 5a and can be received with clearance in the second section 5b of the recess or opening 5. However, this follower 106 does not effect forward and backward movements of the magazine. To this end, the rod 101a is provided with a radially extending motion transmitting tooth 107 which can operate a transmission a portion of which is shown in FIG. 6. Of course, the tooth 107 can operate the transmission only when the follower 106 is received in the second section 5b of the recess 5, i.e., in the starting position of the actuating member 101. The cam 25 which operates the slide changer 21 is not shown in FIGS. 5 and 6; this cam is mounted in the same way as shown in FIG. 1. The rod 101a can be mounted in two or more bearings 3.

When a fresh magazine is inserted into the housing of a slide projector which embodies the actuating member 101 of FIGS. 5 and 6 in such a way that the foremost slide 28 is in the range of the slide changer 21 (see also FIG. 1), the foremost slide will be moved to projection position 27 in response to axial movement of the rod 101a (arrow A in FIG. 5). The side walls of the slot 5a prevent turning of the knob 102. Return movement of the foremost slide from projection position 27 back into the corresponding compartment of the magazine is effected in response to axial movement of the rod 101a back to the starting position shown in FIG. 5 (arrow B). when the follower 106 is accommodated in the section 5b of the recess 5 but continues to register with the slot 5a, the tooth 107 is in neutral or zero position and the transmission between the tooth 107 and slide magazine allows the operator to shift the magazine to any desired position or to withdraw the magazine from the projector.

The aforementioned transmission comprises two pins 108, 109 (FIG. 6) mounted on a rocker or slide 110. The pins 108, 109 are analogous to the prongs 31b, 31c of the rocker 31 shown in FIGS. 3 and 4, and this rocker is the functional equivalent of the slide 110. When the knob 102 causes the tooth 107 to turn in a clockwise direction (arrow D in FIG. 6), the slide 110 causes the magazine to advance forwardly by a step to place the second slide into registry with the claws of the slide changer. If the knob 102 turns the tooth 107 in a counterclockwise direction (arrow C in FIG. 6), the magazine travels backwards, again by a step, to place the foremost slide back into the range of the slide changer.

Figure 7:
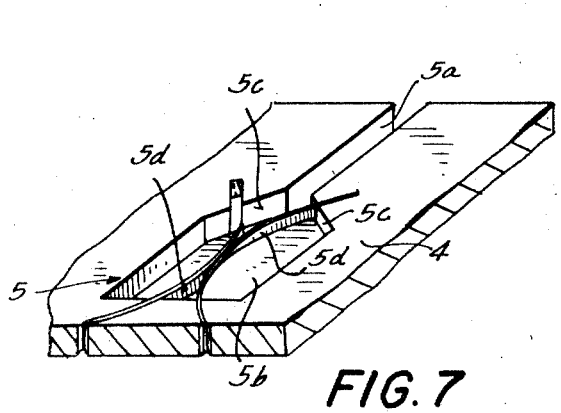
FIG. 7 is an enlarged fragmentary perspective view of a guide member for the actuating member of FIGS. 5 and 6.

FIG. 7 illustrates in greater detail the outline of the recess or opening 5. The section 5b is bounded in part by two side faces 5c which converge toward the adjoining end of the slot 5a so that the follower 106 automatically enters the slot 5a when the rod 101a is moved axially (arrow A) in a sense to operate the slide changer and to transfer a slide from the magazine into the projection position. Thus, the side faces 5c insure that the follower 106 finds its way into the slot 5a when the knob 102 is pushed in the direction indicated by arrow A.

If desired, the guide means for the actuating member 101 may be further provided with biasing means for yieldably holding the follower 106 in registry with the slot 5a (neutral position of the magazine) when the actuating member 101 is held in starting position. Such biasing means is shown in FIG. 7 and comprises two arcuate leaf springs 5d mounted in the section 5b of the recess 5 and serving to act against the respective sides of the follower 106. These leaf springs insure that, when the actuating member 101 returns to the starting position of FIG. 5, the follower 106 remains in line with the slot 5a unless, of course, the knob 102 is intentionally turned to rotate the tooth 107 (arrows C and D in FIG. 6). The springs 5d further insure that the tooth 107 returns to the position shown in FIG. 6 as soon as the operator releases the knob 102. The operator must overcome the bias of one of the springs 5d whenever he wishes to shift the magazine forwardly or backwards.

The recess 5 of FIG. 1 is preferably shaped in the same way as shown in FIG. 7 and its section 5b can also accommodate two leaf springs 5d or equivalent biasing means for the follower 6.

Figure 8:
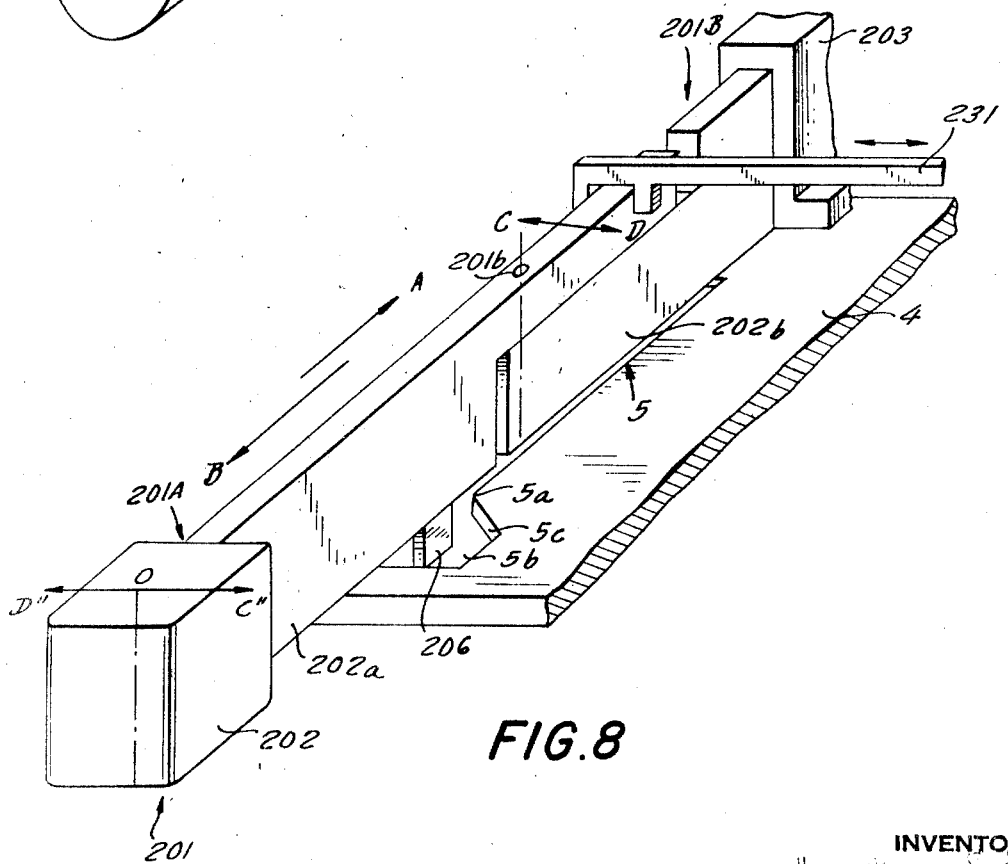
FIG. 8 is a fragmentary perspective view of a third slide projector wherein the actuating member comprises two articulately connected portions.

Referring finally to FIG. 8, there is shown a portion of a third slide projector wherein the actuating member 201 comprises two articulately connected portions 201A, 201B. The outer portion 201A includes a bar 202a and a knob 202. The free end of the bar 202a is connected with a bar 202b of the portion 202B by a pivot pin 201b. The bar 201a has a follower 206 which is a functional equivalent of the follower 106 shown in FIG. 5, i.e., it merely prevents pivotal movements of the knob 202 (arrows C, D) while extending into the slot 5a but it cannot effect forward or backward movement of the magazine. The bar 202b is guided in a bearing 203 of a stationary guide member 4, and this bar can operate the slide changer (not shown) in the same way as described in connection with FIG. 1, i.e., it is preferably provided with a cam corresponding to the cam 25.

The section 5b of the recess 5 is bounded in part by two side faces 5c and can accommodate leaf springs similar to the springs 5d of FIG. 7 to maintain the follower 206 in a neutral position in which the magazine is freely movable with reference to the housing of the slide projector. The transmission which moves the magazine forwardly or backwards comprises a slide 231 whose bifurcated end straddles a portion of the bar 201a. Lengthwise movements of the slide 231 (arrows C and D) are utilized to move the magazine.

The bar 201a cannot turn about the pivot pin 201b when the follower 206 extends into the slot 5a, i.e., the magazine can be transported only when the actuating member 201 assumes its starting position.

The guide member 4 of FIG. 8 is preferably installed in horizontal position so that the portion 201A can move in a horizontal plane. In other words, the entire actuating member 201 moves horizontally in order to transport a slide from or back into the magazine, and the portion 201A pivots horizontally about the pin 201b (arrows C", D") when the operator wishes to transport the magazine.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims:

1. In a slide projector, a combination comprising a housing arranged to support a displaceable magazine for a supply of slides; transporting means installed in said housing and operative to move selected slides between the magazine and a projection position; control means for operating said transporting means and for displacing the magazine with reference to said housing, said control means comprising an actuating member movable in a first direction between first and second positions to thereby operate said transporting means and at least a portion of said actuating member being movable in a second direction in said first position thereof to effect displacement of the magazine so as to place a fresh slide into the range of said transporting means; and guide means provided in said housing to hold said actuating member against movement in said second direction when the actuating member is out of said first position.

2. A combination as defined in claim 1, wherein said actuating member is elongated and is movable lengthwise in said first direction.

3. A combination as defined in claim 1, wherein said actuating member comprises two articulately connected portions which move together in said first direction and one of which is movable with reference to the other thereof in said second direction.

4. A combination as defined in claim 3, wherein said one portion of said actuating member travels in a horizontal plane during movement in said second direction.

5. A combination as defined in claim 1, further comprising means for biasing said actuating member to a neutral position against movement in said second direction.

6. A combination as defined in claim 1, wherein said transporting means comprises claws movable into and from engagement with the frames of slides in the magazine.

7. A combination as defined in claim 1, wherein said actuating member comprises motion transmitting means operative to effect displacement of the magazine in response to movement of said portion of the actuating member in said second direction.

8. A combination as defined in claim 7, further comprising a transmission receiving motion from said motion transmitting means and arranged to effect displacement of the magazine.

9. A combination as defined in claim 8, wherein said motion transmitting means is movable back and forth by said portion of said actuating member during movement of the latter in said second direction to thereby displace the magazine forwardly and backwards.

10. In a slide projector, a combination comprising a housing arranged to support a displaceable magazine for a supply of slides; transporting means installed in said housing and operative to move selected slides between the magazine and a projection position; control means for operating said transporting means and for displacing the magazine with reference to said housing, said control means comprising an elongated actuating member including a rod movable axially in a first direction between first and second positions to thereby operate said transporting means and at least a portion of said actuating member being rotatable in a second direction in said first position thereof to effect displacement of the magazine so as to place a fresh slide into the range of said transporting means; and guide means provided in said housing to hold said actuating member against movement in said second direction when said actuating member is out of said first position.

11. In a slide projector, a combination comprising a housing arranged to support a displaceable magazine for a supply of slides; transporting means installed in said housing and operative to move selected slides between the magazine and a projection position; control means for operating said transporting means and for displacing the magazine with reference to said housing, said control means comprising an elongated actuating member movable lengthwise in a first direction between first and second positions to thereby operate said transporting means and at least a portion of said actuating member being movable in a second direction in said first position thereof to effect displacement of the magazine so as to place a fresh slide into the range of said transporting means; and guide means provided in said housing to hold said actuating member against movement in said second direction when the actuating member is out of said first position, said guide means comprising a stationary member having a recess including a relatively narrow first section and a relatively wide second section, said actuating member comprising a follower arranged to extend snugly into said first section during lengthwise movement from said first position and to extend with clearance into said second section in the first position of said actuating member.

12. In a slide projector, a combination comprising a housing arranged to support a displaceable magazine for a supply of slides; transporting means installed in said housing and operative to move selected slides between the magazine and a projection position; control means for operating said transporting means and for displacing the magazine with reference to said housing, said control means comprising an actuating member movable in a first direction between first and second positions to thereby operate said transporting means and at least a portion of said actuating member being movable in a second direction in said first position thereof to effect displacement of the magazine so as to place a fresh slide into the range of said transporting means, said actuating member comprising two articulated connected portions which move together in said first direction and one of which is movable with reference to the other thereof in said second direction; and guide means provided in said housing to hold said one portion of said actuating member against movement in said second direction when the actuating member is out of said first position, said guide means comprising a stationary member having a recess including a relatively narrow first section and a relatively wide second section, said one portion of said actuating member having follower means extending snugly into said first section when said actuating member leaves said first position thereof and said follower means being received with clearance in said second section in the first position of said actuating member.

13. In a slide projector, a combination comprising a housing arranged to support a displaceable magazine for a supply of slides; transporting means installed in said housing and operative to move selected slides between the magazine and a projection position; control means for operating said transporting means and for displacing the magazine with reference to said housing, said control means comprising an actuating member movable in a first direction between first and second positions to thereby operate said transporting means and at least a portion of said actuating member being movable in a second direction in said first position thereof to effect displacement of the magazine so as to place a fresh slide into the range of said transporting means; guide means provided in said housing to hold said actuating member against movement in said second direction when the actuating member is out of said first position, said guide means comprising a stationary member having a recess including a relatively narrow first section and a relatively wide second section, said actuating member comprising follower means snugly received in said first section when the actuating member leaves said first position and said follower means being received with clearance in said second section in the first position of said actuating member; and means for biasing said actuating member to a neutral position against movement in said second direction, comprising means for yieldably holding said follower means in registry with said first section in the first position of said actuating member.

14. A combination as defined in claim 13, wherein said stationary member has side faces bounding said second section and converging toward said first section of said recess to guide said follower means into said first section when the actuating member leaves said first position.

15. A combination as defined in claim 13, wherein said means for yieldably holding the follower means in registry with the first section of said recess comprises springs installed in said second section.

16. A combination as defined in claim 15, wherein said springs are leaf springs.

References Cited

UNITED STATES PATENTS

| 2,874,497 | 2/1959 | Huff et al. | 353—116 |
|---|---|---|---|
| 2,982,177 | 5/1961 | Briskin et al. | 353—103 |
| 3,165,971 | 1/1965 | Zillmer et al. | 40—79 X |
| 3,171,222 | 3/1965 | Sakaki et al. | 353—118 |
| 3,174,395 | 3/1965 | Krull | 353—118 |

FOREIGN PATENTS

| 1,031,028 | 5/1958 | Germany. |
|---|---|---|
| 1,046,363 | 12/1958 | Germany. |

HARRY N. HAROIAN, Primary Examiner

U.S. Cl. X.R.

353—118